United States Patent
Athley et al.

(10) Patent No.: US 11,464,028 B2
(45) Date of Patent: Oct. 4, 2022

(54) APPARATUSES AND METHODS FOR MULTI-USER TRANSMISSIONS

(71) Applicant: Telefonaktiebolaget LM Ericsson (publ), Stockholm (SE)

(72) Inventors: Fredrik Athley, Kullavik (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 688 days.

(21) Appl. No.: 16/334,473

(22) PCT Filed: Feb. 14, 2019

(86) PCT No.: PCT/EP2019/053739
§ 371 (c)(1),
(2) Date: Mar. 19, 2019

(87) PCT Pub. No.: WO2020/164723
PCT Pub. Date: Aug. 20, 2020

(65) Prior Publication Data
US 2021/0360649 A1 Nov. 18, 2021

(51) Int. Cl.
*H04W 72/12* (2009.01)
*H04B 7/0452* (2017.01)
*H04B 7/06* (2006.01)
*H04L 5/00* (2006.01)
*H04W 24/08* (2009.01)

(52) U.S. Cl.
CPC ...... *H04W 72/1231* (2013.01); *H04B 7/0452* (2013.01); *H04B 7/0695* (2013.01); *H04L 5/0048* (2013.01); *H04W 24/08* (2013.01); *H04W 72/121* (2013.01)

(58) Field of Classification Search
CPC ............ H04W 72/1231; H04W 24/08; H04W 72/121; H04B 7/0452; H04B 7/0695; H04B 7/06952; H04L 5/0048
See application file for complete search history.

(56) References Cited

U.S. PATENT DOCUMENTS

| | | |
|---|---|---|
| 9,083,398 B2 | 7/2015 | Dartois et al. |
| 2007/0285312 A1 | 12/2007 | Gao et al. |
| 2008/0111740 A1* | 5/2008 | Hirabe ............ H01Q 1/246 342/361 |

(Continued)

FOREIGN PATENT DOCUMENTS

| | | |
|---|---|---|
| WO | 2017/014610 A1 | 1/2017 |
| WO | 2017/196612 A1 | 11/2017 |

OTHER PUBLICATIONS

International Search Report and Written Opinion issued in International Application No. PCT/EP2019/053739 dated Nov. 6, 2019 (14 pages).

*Primary Examiner* — Ian N Moore
*Assistant Examiner* — Sun Jong Kim
(74) *Attorney, Agent, or Firm* — Rothwell, Figg, Ernst & Manbeck, P.C.

(57) ABSTRACT

A TRP selects two UEs that have potential for MU-MIMO transmission, and the TRP then measures signal and interference for each panel in both UEs based on UL beam management for a set of one or more candidate TRP beams. Based on the measurements, the TRP determines if multi-user transmission (i.e., co-scheduling of the two UEs) is possible.

20 Claims, 13 Drawing Sheets

(56) References Cited

U.S. PATENT DOCUMENTS

| | | | |
|---|---|---|---|
| 2009/0286547 A1* | 11/2009 | Tangemann | H04B 7/0491 |
| | | | 455/452.2 |
| 2012/0264469 A1* | 10/2012 | Dartois | H04B 7/0408 |
| | | | 455/509 |
| 2016/0087336 A1* | 3/2016 | Maltsev | H04B 7/0695 |
| | | | 342/368 |
| 2017/0118727 A1* | 4/2017 | Panchal | H04W 72/0413 |
| 2018/0091274 A1* | 3/2018 | Islam | H04B 7/0621 |
| 2018/0198582 A1* | 7/2018 | Andersson | H04L 5/0094 |
| 2019/0058561 A1* | 2/2019 | Ho | H04B 7/088 |
| 2019/0081714 A1* | 3/2019 | Xiang | H04W 24/10 |
| 2020/0358494 A1* | 11/2020 | Tang | H04B 7/0691 |

\* cited by examiner

APPARATUSES AND METHODS FOR MULTI-USER TRANSMISSIONS

CROSS REFERENCE TO RELATED APPLICATION(S)

This application is a 35 U.S.C. § 371 National Stage of International Patent Application No. PCT/EP2019/053739, filed Feb. 14, 2019, designating the United States.

TECHNICAL FIELD

This disclosure relates to apparatuses and methods for multi-user transmissions (e.g., multi-user, multiple-input, multiple-output (MU-MIMO) transmissions).

BACKGROUND

Beam Management

Narrow beam transmission and reception schemes are typically needed at higher frequencies to compensate for high propagation loss. For a given communication link, a beam can be applied at both the transmit/receive point (TRP) (i.e., an access point, such as a base station, or a component of an access point) and a user equipment (UE), which will be referred to as a beam pair link (BPL) in this disclosure.

A beam management procedure is employed to discover and maintain a TRP 104 beam 112 (e.g., a TRP transmit (TX) beam) and/or a UE 102 beam 116 (e.g., a UE receive (RX) beam). In the example of FIG. 1, one BPL has been discovered (i.e., the beam pair that consists of TRP beam 112 and UE beam 116) and is being maintained by the network. A BPL is expected to mainly be discovered and monitored by the network using measurements on downlink (DL) reference signals (RSs) used for beam management, e.g., CSI-RS (channel-state-information RS). The CSI-RS for beam management can be transmitted periodically, semi-persistently or aperiodic (event triggered) and they can be either shared between multiple UEs or be UE-specific. In order to find a suitable TRP TX beam the TRP 104 transmits CSI-RS in different TRP TX beams on which the UE 102 performs RSRP measurements and reports back the N best TRP TX beams (where N can be configured by the network). Furthermore, the CSI-RS transmission on a given TRP TX beam can be repeated to allow the UE to evaluate suitable UE beam (UE RX beam training).

Antenna Architectures

There are basically three different implementations of beamforming, both at the TRP and at the UE: 1) analog beamforming, 2) digital beamforming, and 3) hybrid beamforming. Each implementation has its pros and cons. Digital beamforming is the most flexible solution but also the costliest due to the large number of required radios and baseband chains. Analog beamforming is the least flexible but cheaper to manufacture due to reduced number of radio and baseband chains. Hybrid beamforming is a compromise between the analog and digital beamforming. One type of beamforming antenna architecture that has been agreed to study in 3GPP for the New Radio (NR) access technology is the concept of antenna panels, both at the TRP and at the UE. An antenna panel (or "panel" for short) is an antenna array of single-polarized or dual-polarized antenna elements with typically one transmit/receive unit (TX/RU) per polarization. An analog distribution network with phase shifters is used to steer the beam of each panel. FIG. 2A illustrates an example of a two-dimensional dual-polarized panel and FIG. 2B illustrates an example of a one-dimensional dual-polarized panel, where each panel is connected to one TXRU per polarization.

MU-MIMO

MU-MIMO is expected to be one of the important technical components in 5G. The purpose of MU-MIMO is to enable MU transmissions—i.e., serve two or more UEs simultaneously using the same or overlapping frequency resources and code resources, if any, and in this way increase the capacity of the system. If the TRP (e.g., 5G base station (a.k.a., gNB)) has multiple panels it can perform MU-MIMO transmission by, for example, transmitting to a first UE from one panel and transmitting to a second UE using the other panel. To achieve significant capacity gains with MU-MIMO, it is important to ensure low interference between these co-scheduled UEs. This can be achieved by making accurate channel state information (CSI) available at the TRP to facilitate interference nulling in the precoding (mainly applicable for digital arrays), and/or by co-scheduling UEs that have close to orthogonal channels. An example of the latter is if two UEs are in line-of-sight and have an angular separation larger than the beamwidth of the panels. In this case, the two UEs can be co-scheduled (e.g., served using the same time and frequency resources as well as code resources, if any) by transmitting with a first beam directed to the first UE from the first panel and transmitting with a second beam directed to the second UE from the second panel.

MU-MIMO with Rel-15 Beam Management Framework

To enable MU-MIMO for analog panels at the TRP, it is beneficial that the TRP determines a TRP TX beam for each respective UE which keeps the inter-UE interference low while maintaining a strong signal for each UE, and in this way attaining high SIR (or SINR) for both UEs.

One method to select a suitable TRP TX beam using the release 15 (Rel-15) beam management framework is illustrated in FIG. 3A. In FIG. 3A, the TRP 304 has determined two UEs 302a and 302b that it would like to co-schedule in the DL direction, and therefore would like to find suitable TRP TX beams for both UEs. In the first step, the TRP performs a TRP TX beam sweep A, which means that CSI-RS resources are transmitted using a set 301 of three different TRP TX beams roughly pointing in a direction towards UE 302a (the approximate direction of each UE can be obtained for example based on UE reports of the strongest Synchronization Signal Block (SSB) beam). Both UEs are triggered to perform RSRP measurements on the CSI-RS resources of TRP TX beam sweep A and report the RSRP for respective TRP TX beam. Note that the RSRP should preferably be as high as possible for UE 302a and as low as possible for UE 302b (since it will be considered as interference for UE 302b) in order to maximize the MU-MIMO performance.

In the second step, the same thing is done again, except that a new set of TRP TX beams 303 are use during the CSI-RS transmission, where the new set 303 of TRP TX beams point roughly in the direction of UE 302b. Again, both UEs report RSRP for all three TRP TX beams. The TRP now has access to received signal strength for both UEs from all 6 TRP TX beams. In step 3 the TRP evaluates the SIR for all 9 different combinations of TRP TX beam pairs (where each combination consists of one TRP TX beam from beam sweep A to be used for transmission to UE 302a and one TRP TX beam from beam sweep B to be used for transmission to UE 302b). The TRP can then select the TRP TX beam combination that for example maximizes the average SIR over both UEs, as shown in FIG. 3B.

Uplink (UL) Beam Management

Some UEs might have analog beamformers without beam correspondence, which basically means that DL/UL reciprocity cannot be used to determine the beams for these beamformers. For such UEs, the UE beam used for UL cannot be derived from beam management procedures based on DL reference signals as described above. To handle such UEs, UL beam management has been included in the NR standard specification for Rel-15. The main difference between normal beam management and UL beam management is that UL beam management utilizes uplink reference signals instead of DL references signals. The UL reference signals that has been agreed to be used for UL beam management is Sounding reference signals (SRS). Two UL beam management procedures are supported in NR: U2 and U3, which are schematically illustrated in FIG. 4A and FIG. 4B, respectively. The U2 procedure is performed by UE 402 transmitting a burst of SRS resources in one UE TX beam 401 and letting the TRP 404 evaluate different TRP RX beams 403. The U3 procedure lets the UE 402 evaluate a suitable UE TX beam by transmitting different SRS resources in different UE TX beams 405.

UL Beam Management for Multi-Panel UEs

In order to improve coverage and increase the order of spatial multiplexing, a UE may be equipped with two or more panels, preferably pointing in different directions. One example of such implementation is illustrated in FIG. 5, which shows a UE 502 having two one-dimensional panels pointing in different directions. In order to handle UL beam management for such UEs in an efficient manner (to minimize overhead), it has been agreed in the standard that the TRP can trigger the UE to transmit one SRS resource set per UE panel simultaneously, which means that the UE can perform multiple simultaneous UL beam management procedures, one per UE panel.

It is also possible that a UE is not equipped with panels, but for example instead has directional antennas pointing in different directions as schematically illustrated in FIG. 6, which shows a UE 602 having four antennas 611, 612, 613, and 614 pointing in different directions. Since each of the directional antennas only has a single fixed beam (and we assume that each antenna/panel is connected to one radio chain), the U3 procedure is not needed for such UE implementation. However, the TRP can still trigger the U2 procedure per UE antenna, in order to find suitable TRP TX/RX beams.

SUMMARY

Certain challenges presently exist. For example, with a downlink beam management solution based on 3GPP NR Rel-15 it is difficult to determine if two UEs can be co-scheduled (e.g., served by the TRP using the same time and frequency resources as well as code resources, if any). It is also difficult for the TRP to determine the best TRP TX beams since it is not clear with which panels the UE are receiving the different TRP TX beams.

To overcome this problem, the TRP selects two UEs that have potential for MU-MIMO transmission, and the TRP then measures signal and interference for each panel in both UEs based on UL beam management for a set of one or more candidate TRP beams. Based on the measurements, the TRP determines if multi-user transmission (i.e., co-scheduling of the two UEs) is possible and which TRP beam to use for each respective UE.

Accordingly, in one aspect there is provided method for scheduling at least a first UE and a second UE for a multi-user (MU) transmission (e.g., MU-MIMO), wherein the first UE comprises a first antenna arrangement and a second antenna arrangement and the second UE comprises a first antenna arrangement and a second antenna arrangement. The method includes establishing the set of one or more candidate TX beams for the first UE and establishing the set of one or more candidate TX beams for the second UE. The method also includes using a first RX beam to receive a reference signal transmitted by the first UE using the first UE's first antenna arrangement, wherein the first RX beam corresponds to a first TX beam included in the set of candidate TX beams for the first UE. The method also includes, based on a signal strength of the reference signal transmitted by the first UE using the first UE's first antenna arrangement and received using the first RX beam, determining a first path gain (pg_b1_p11). The method also includes using the first RX beam to receive a reference signal transmitted by the second UE using the second UE's first antenna arrangement. The method also includes, based on a signal strength of the reference signal transmitted by the second UE using the second UE's first antenna arrangement and received using the first RX beam, determining a second path gain (pg_b1_p21). The method also includes using a second RX beam to receive a reference signal transmitted by the first UE using the first UE's first antenna arrangement, wherein the second RX beam corresponds to a first TX beam included in the set of candidate TX beams for the second UE. The method also includes, based on a signal strength of the reference signal transmitted by the first UE using the first UE's first antenna arrangement and received using the second RX beam, determining a third path gain (pg_b3_p11). The method also includes using the second RX beam to receive a reference signal transmitted by the second UE using the second UE's first antenna arrangement. The method also includes, based on a signal strength of the reference signal transmitted by the second UE using the second UE's first antenna arrangement and received using the second RX beam, determining a fourth path gain (pg_b3_p21). The method also includes using the first path gain, the second path gain, the third path gain, and the fourth path gain in a process for determining whether the first UE and the second UE can be scheduled for the multi-user transmission.

An advantage of the above described embodiment is that the network performance is improved because the TRP can make more reliable decision when co-scheduling UEs (e.g., co-scheduling UEs for MU-MIMO transmissions).

BRIEF DESCRIPTION OF THE DRAWINGS

The accompanying drawings, which are incorporated herein and form part of the specification, illustrate various embodiments.

DETAILED DESCRIPTION

Figure 1:
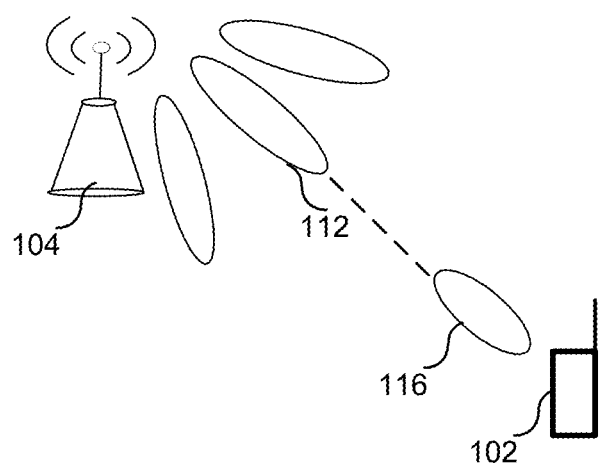
FIG. 1 illustrates a conventional beam-pair link (BPL).
Figure 2A:
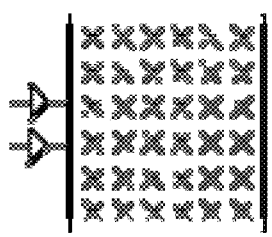
FIG. 2A illustrates an example of a two-dimensional dual-polarized panel.
Figure 2B:
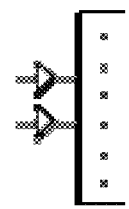
FIG. 2B illustrates an example of a one-dimensional dual-polarized panel.
Figure 3A:
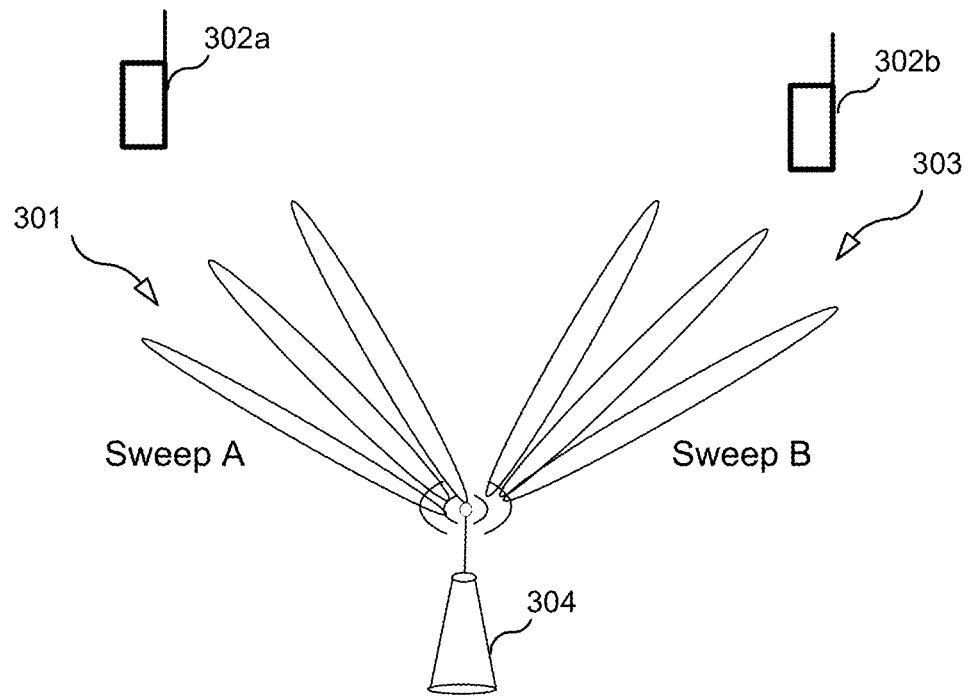
FIG. 3A illustrates one method to select a suitable TRP TX beam using the release 15 (Rel-15) beam management framework.
Figure 3B:
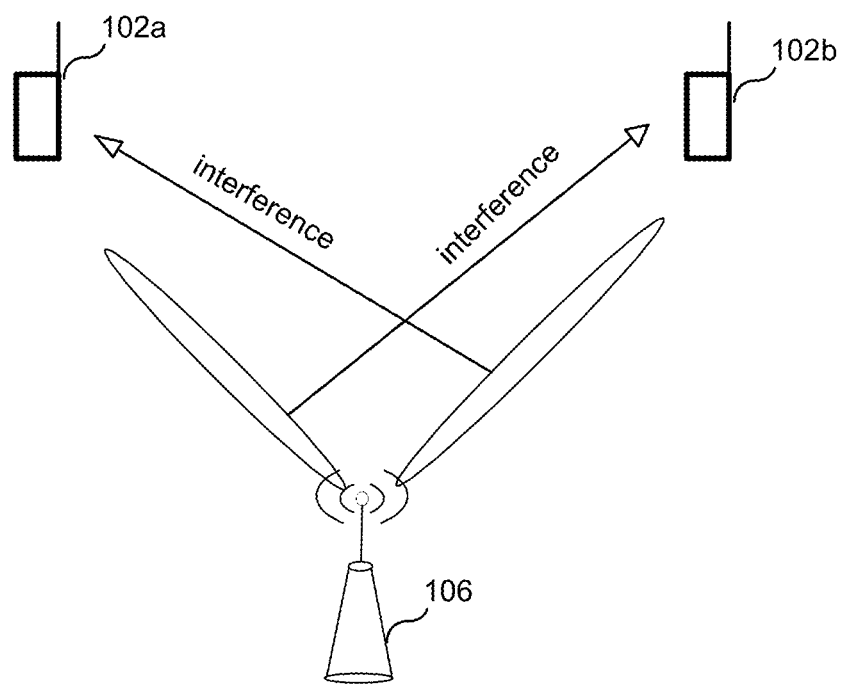
FIG. 3B illustrates a TRP using two TRP TX beams to communicate with two UEs simultaneously.
Figure 4A:
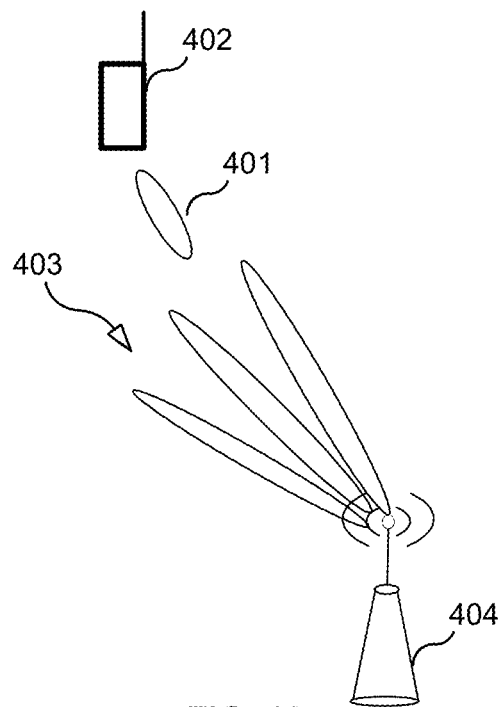
FIG. 4A illustrates the U2 beam management procedure.
Figure 4B:
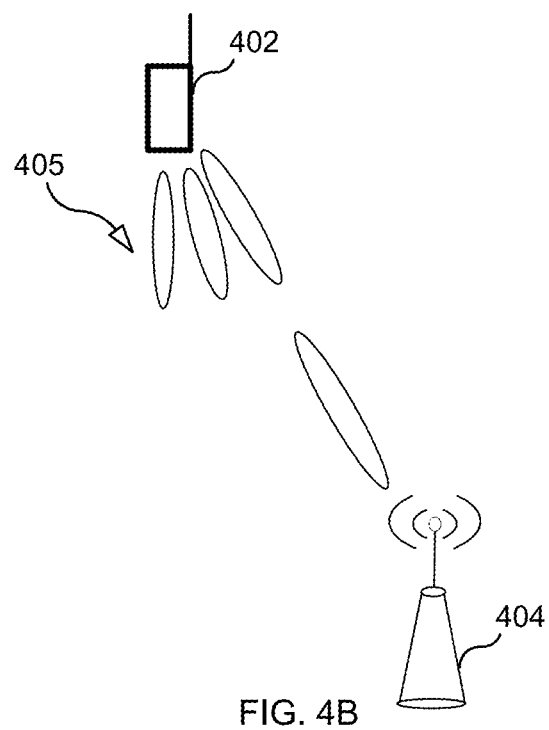
FIG. 4B illustrates the UE3 beam management procedure.
Figure 5:
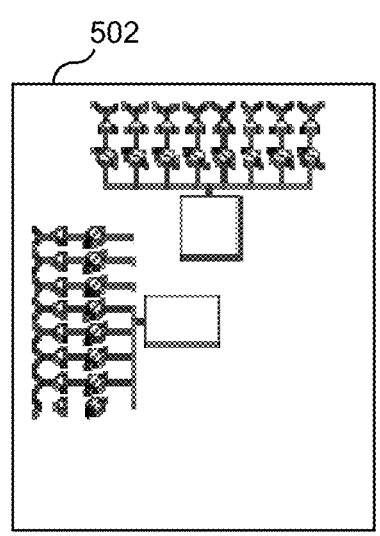
FIG. 5 illustrates a UE being equipped with at least two panels.
Figure 6:
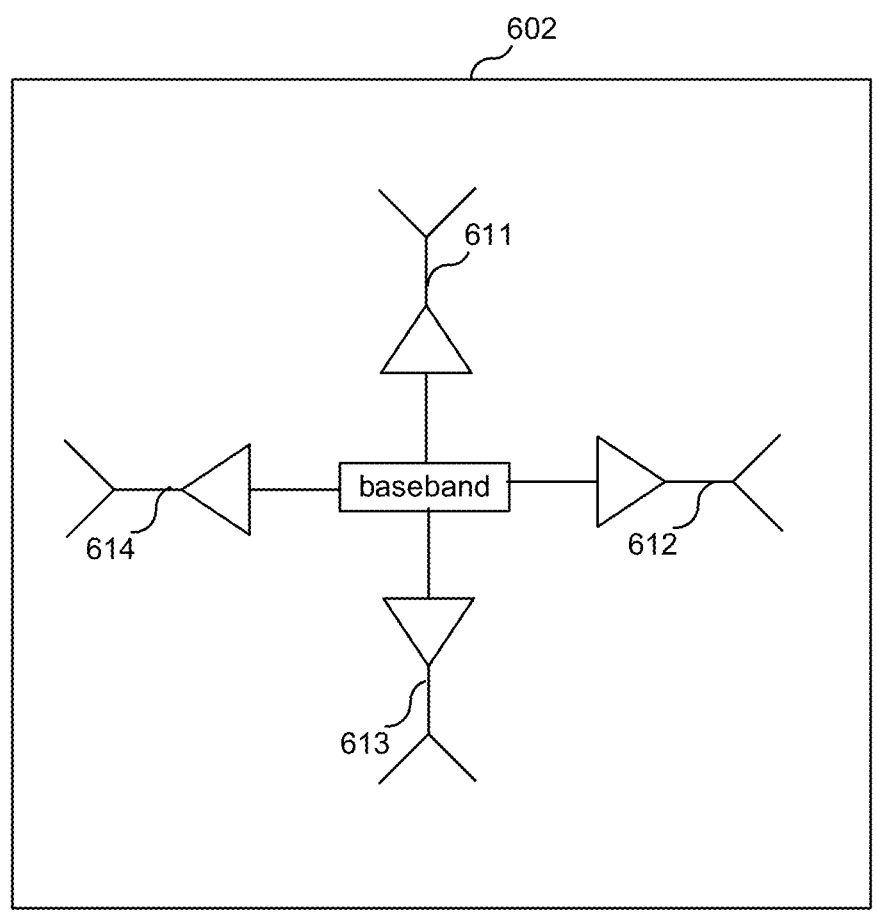
FIG. 6 illustrates a UE being equipped with directional antennas pointing in different directions.
Figure 7:
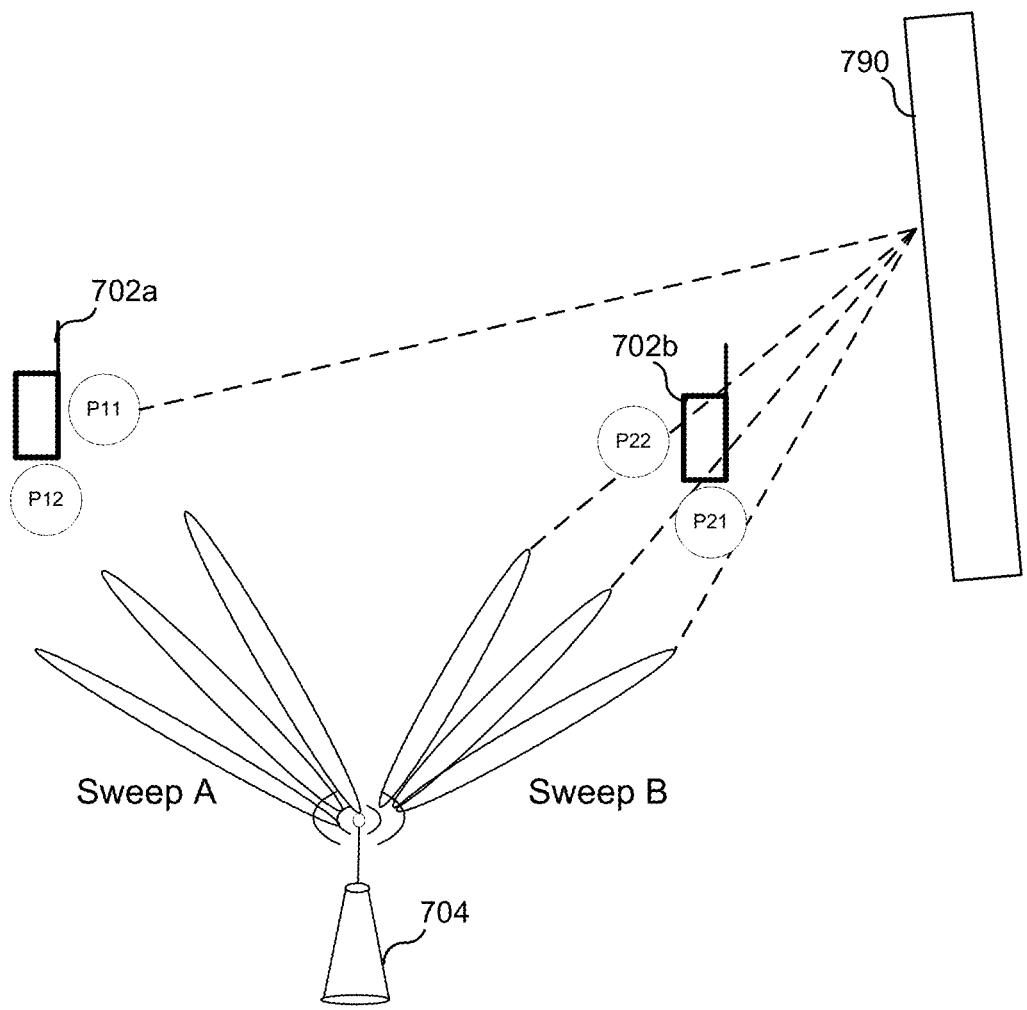
FIG. 7 illustrates a TRP performing two TRP TX beam sweeps (sweep A and sweep B).
Figure 8:
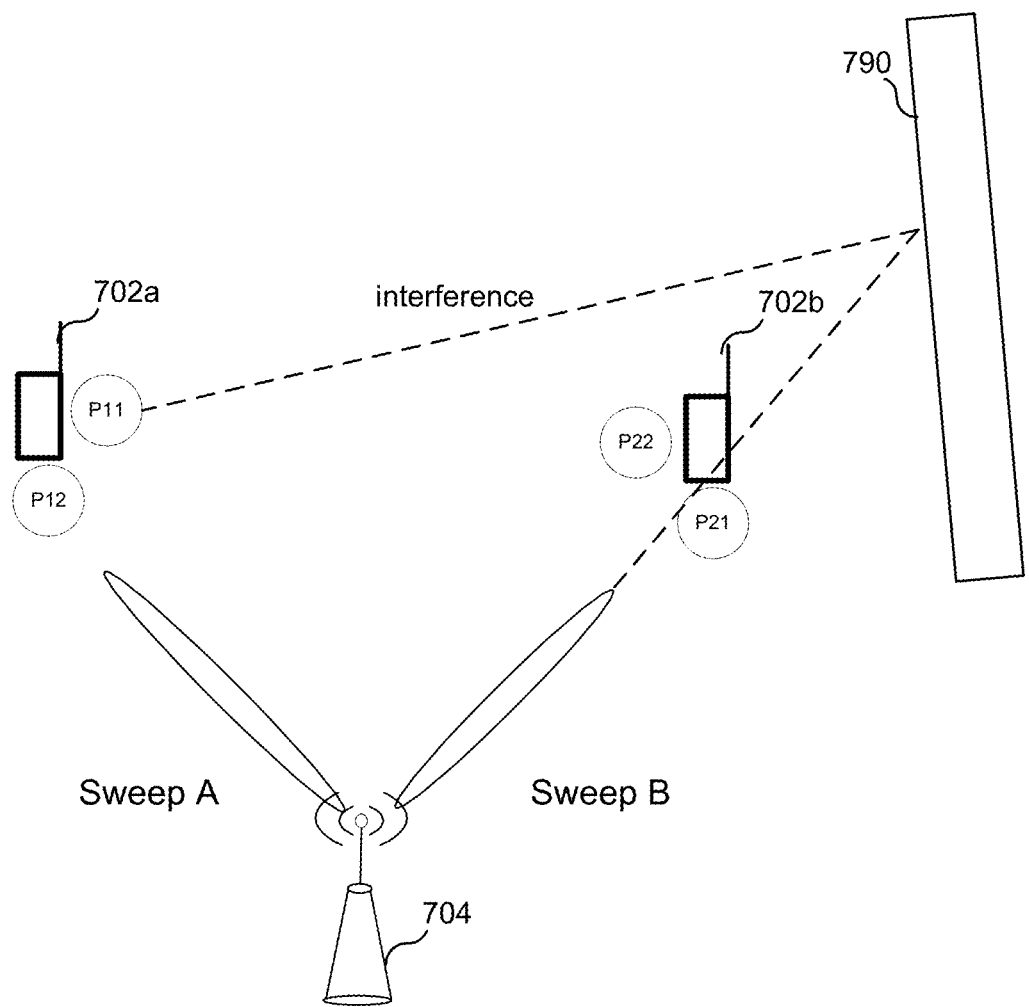
FIG. 8 illustrates a TRP using two TRP TX beams to communicate with two UEs simultaneously and further illustrates that one of the UEs experiences interference due to the communication between the TRP and the other UE.

FIG. 7 and FIG. 8 illustrate an example of a problem associated with the Rel-15 downlink beam management solution for MU-MIMO described above. In this example, there are two UEs (UE 702a and UE 702b), each with two antenna arrangements (P11, P12 for UE 702a and P21, P22 for UE 702b), where the antenna arrangements for each UE are pointing in different directions. As illustrated in FIG. 7, during the TRP TX beam sweep B, both UE 702a and UE 702b will report strong RSRP for all three TRP TX beams, since there is a reflection in a wall 790 that creates a strong path between the TRP TX beams in TRP TX beam sweep B and the panel P11 of UE 702a. This means that both UEs will report strong RSRP values for all TRP TX beams in TRP TX beam sweep B and hence the TRP will assume that it is not possible to co-schedule the two UEs (e.g., schedule the two UEs for MU-MIMO transmission).

However, as can be seen in FIG. 8, it would be possible to co-schedule the two UEs since the best TRP TX beam from TRP TX beam sweep A will be received mainly with antenna/panel P12 of UE 702a, while the interference from the best TRP TX beam from TRP TX beam sweep B will be received mainly with antenna/panel P11 of UE 702a. Hence it is easy for UE 702a to remove the interference and hence attain a good signal to inference measure (SIM) (e.g., good SIR or SINR) with just a simple IRC receiver (or in a more simple case, only receive with the panel without the strong interference), which can be assumed to be available at UEs with multiple receiver antenna/panels.

Accordingly, with the Rel-15 downlink beam management MU-MIMO solution, it can be difficult to determine if two UEs could be co-scheduled, and determining the best TRP TX beams since it is not clear with which panels the UE are receiving the different TRP TX beams.

To overcome this problem, a TRP measures signal and interference for each panel in both UEs based on UL beam management for a set of one or more candidate TRP beams. Based on the measurements, the TRP determines if multi-user transmission (i.e., co-scheduling of the two UEs) is possible and which TRP beam to use for each respective UE.

Figure 9:
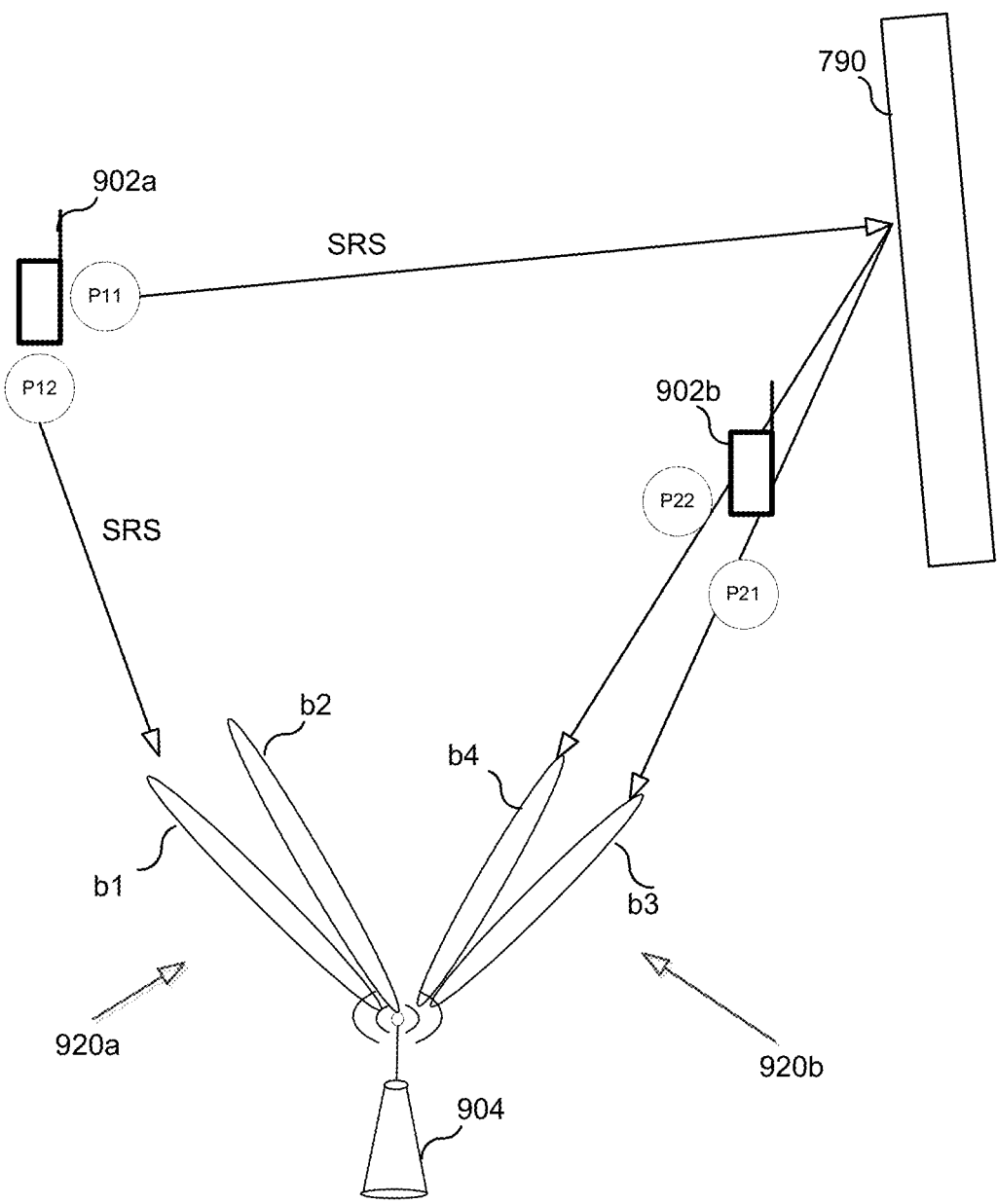
FIG. 9 illustrates a first UE transmitting a sounding reference signal using a first panel and transmitting a sounding reference signal using a second panel.
Figure 10:
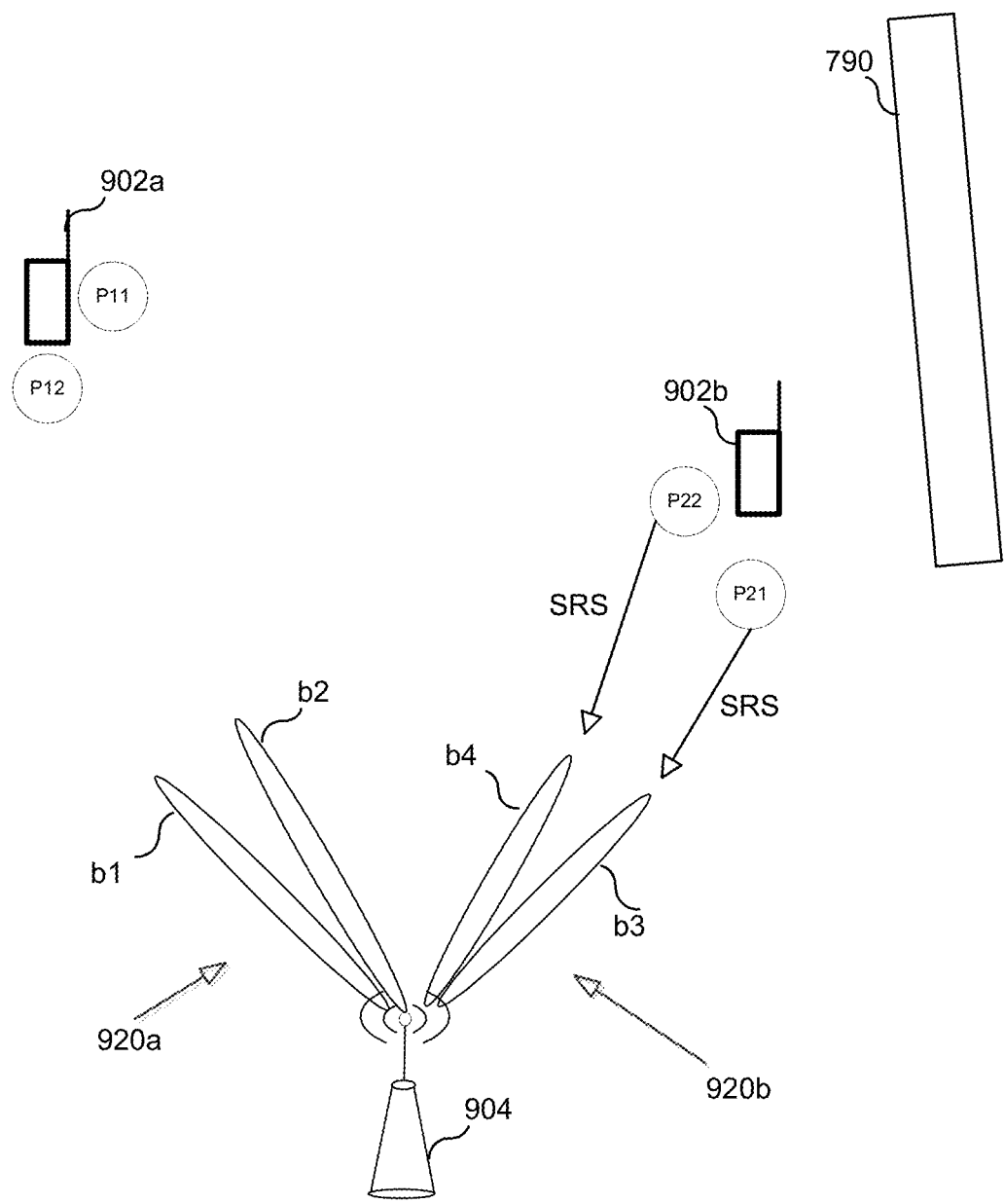
FIG. 10 illustrates a second UE transmitting a sounding reference signal using a first panel and transmitting a sounding reference signal using a second panel.

FIGS. 9 and 10 illustrates one embodiment, which shows a TRP 904 that is configured to perform a process for determining, among other things, whether UE 902a and UE 902b can be co-scheduled—TRP 904 has previously determined that UEs 902a and 902b are candidate for co-scheduling. The two UEs could for example be determined as co-scheduling candidates as a result of TRP 904 determining, among other things, that the estimated angular separation between the UEs is larger than a certain threshold, where the estimated angular direction could be attained for example from reports of strongest SSB beam. By help of the approximate direction of the two UEs, the TRP determines a number of narrow candidate TRP beams for each respective UE, which typically would point in directions around the estimated approximate direction for the respective UE.

In the first step (see FIG. 9) the TRP 904 triggers UE 902a to perform two simultaneous U2 procedures (simultaneous transmission is not needed, but could be used to save overhead and to make the procedure quicker and in that way experience less channel aging, which would have a negative effect on the later data transmission), one for each UE panel (P11 and P12), by transmitting a burst of SRS resources (e.g., a sequential transmission of N SRS resources) for each UE antenna/panel. The number N of transmitted SRS resources should be equal to the number of candidate TRP beams that the TRP would like to evaluate. During the SRS transmission of UE 902a, the TRP should sweep through the candidate TRP beams 920a for UE 902a (which in this example consists of beam b1 and beam b2) on one of its two TRP panels and sweep through the candidate TRP beams 920b for UE 902b on its second TRP panel (which in this example consists of beam b3 and beam b4). In this way the TRP can attain information about how strong the path gain is between UE 902a and the candidate TRP beams for UE 902a (i.e. determine how good the candidate TRP beams 920a for UE 902a is w.r.t. to signal strength), while at the same time attain information about how strong the path gain is between UE 902a and the candidate TRP beams 920b for UE 902b (i.e. determine how strong interference the candidate TRP beams 920b for UE 902b generates to UE 902a).

In the next step (see FIG. 10), the same method is performed, but it is UE 902b that is scheduled with the SRS transmission instead of UE 902a. In this way the TRP 904 may obtain path gain estimates between all different TRP beam candidates (i.e., beams b1, b2, b3, and b4) and respective UE panel for both UEs, and can, with the help of this information, validate that UE 902a and UE 902b can be co-scheduled and determine suitable TRP beam per UE that would be good for MU-MIMO for the two UEs. Note that the TRP should assume that the UE can process the received signal on the different UE panels independently. This means that if for example one UE receives high interference on a first UE panel and high signal strength on a second UE panel, the TRP will assume that the UE can remove the high interference from the first UE panel without deteriorating the received signal on the second UE panel. In this way, the problem as illustrated in FIG. 7 and FIG. 8 can be removed.

In one example, all candidate TRP beams 920b for UE 902b (beams b3 and b4) generate strong interference to panel P11 of UE 902a, while all the candidate TRP beams 920a for UE 902a is received with strong signal in panel P12 of UE 902a. In this case, the TRP can remove panel P11 completely from the TRP beam selections, such that the TRP tries to find suitable TRP beam for respective UE that maximizes the received estimated SIR (or SINR) for both UEs while not consider any measurements related to UE panel P11.

In one embodiment, for each TRP TX beam combination (i.e. one TRP TX beam for UE 902a and one TRP TX beam for UE 902b) the TRP removes the measurements for all UE panels that has stronger interference than received signal.

So, for example, assume that panel P11 for UE 902a has stronger interference compared to received signal (i.e. the TRP receives the SRS resource with stronger power for one of the candidate TRP beams for UE 902b compared to one of the candidate TRP beams for UE 902a from Panel P11), then the TRP removes this panel from the TRP beam selection calculations for that certain TRP beam combination.

In one embodiment the TRP determines suitable TRP beams for the two UEs based on estimated highest average SIM (e.g., SIR or SINR) over both UEs for the different TRP beam combinations while applying any of the embodiments above where every UE panel that has stronger interference compared to received signal strength is removed from the SIM calculation.

In one embodiment, instead of the TRP having two different panels, the TRP has one panel with two orthogonal polarization, where each polarization has individual beam steering and hence can be considered as separate panels (even though they are co-located). The same methods as described above can then be applied also for a "single panel" TRP.

Figure 11:
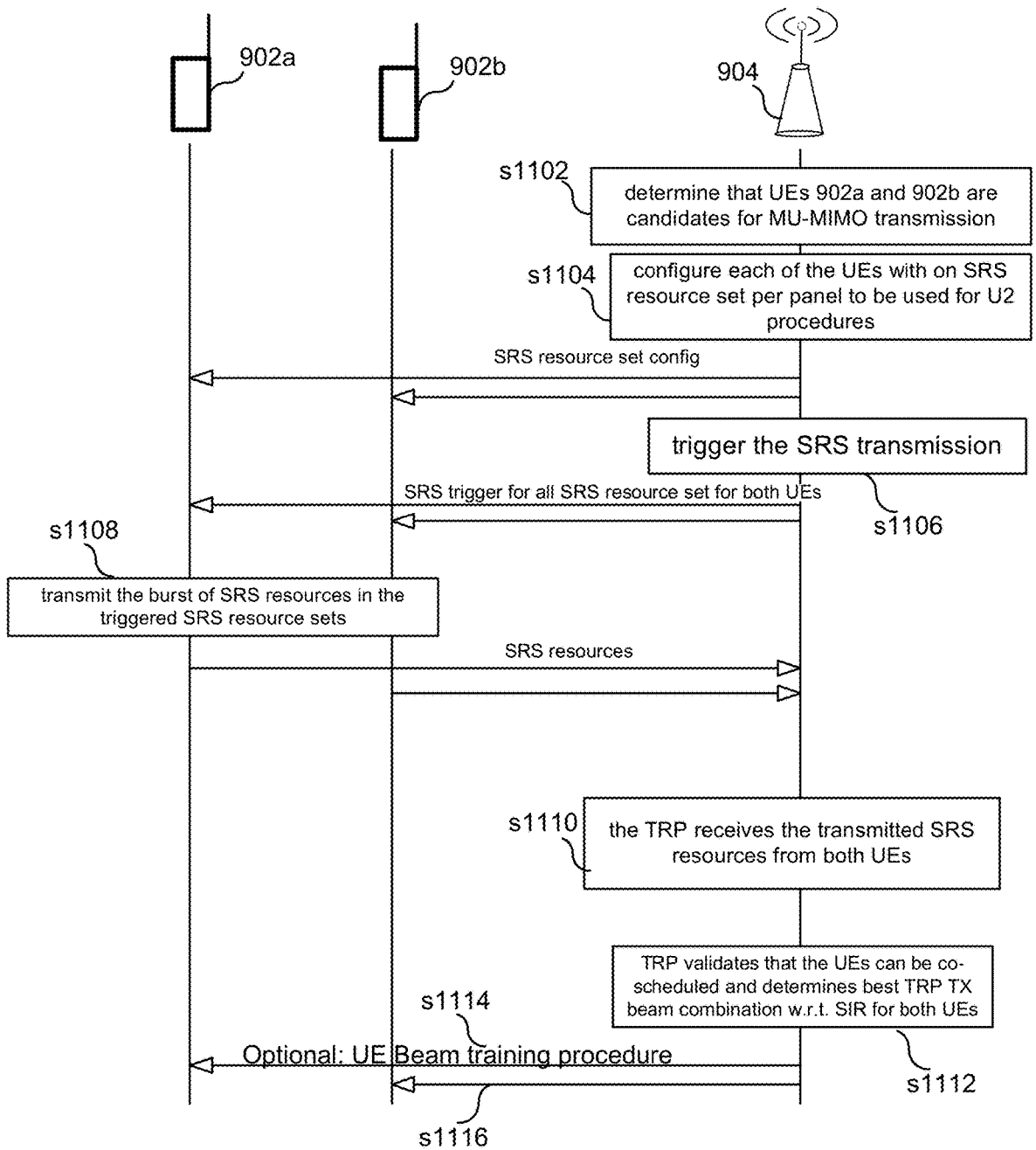
FIG. 11 is an example message flow diagram illustrating a process according to an embodiment.

FIG. 11 illustrates a method according to an embodiment.

In step s1102 the TRP 904 determines that UEs 902a and 902b are candidates for MU-MIMO transmission. The two UEs could for example be selected based on that the estimated angular separation between the UEs is larger than a certain threshold, where the estimated angular direction could be attained for example from reports of strongest SSB beam. By help of the approximate direction of the two UEs, the TRP determines a number of narrow candidates TRP beams 920a and 920b for the respective UEs, which for example could be a number of narrow TRP beams that is confined within the strongest SSB beam for respective UE.

In step s1104, the TRP configures the UEs with SRS resource sets to be used for U2 procedures. The TRP would then configure each UE with as many SRS resource sets as the UE has antenna arrangements.

In step s1106, the TRP triggers the SRS transmission of the two UEs. This can be done for example using Downlink Control Information (DCI), in case the SRS resources in the SRS resource sets have been configured with aperiodic time domain behavior, or the signaling can be done with a medium-access control (MAC) control element (MAC-CE) in case the configured time domain behavior is semi-persistent. If the SRS resource set should be transmitted periodically, Radio Resource Control (RRC) signaling is used to trigger the transmission.

In step s1108, the UEs transmit the burst of SRS resources in the triggered SRS resource sets. This SRS transmission can be performed simultaneously for both UEs, in order to save overhead, or it can be performed at separate time instances.

In the next s1110, the TRP receives the transmitted SRS resources from both UEs. During the reception the TRP sweeps through the candidate TRP beams for UE 902a on one of the TRP panels, and at the same time sweeps through the candidate TRP beams for UE 902b on the second TRP panel. In this way the TRP attains information about how strong the path gain is between UE 902a and the candidate TRP beams for UE 902a (i.e. determine how good the candidate TRP beams for UE 902a is w.r.t. to signal strength), while at the same time attain information about how strong the path gain is between UE 902a and the candidate TRP beams for UE 902b (i.e. determine how strong interference the candidate TRP beams for UE 902b generates to UE 902a). In this way the TRP will attain path gain estimates between all different TRP beam candidates and each of the panel of respective UE.

In step s1112, the TRP use the path gain estimates to validate that the UEs can be co-scheduled and to determine suitable TRP beams per UE that for example maximizes the average SIM for the two UEs, and hence gives a good potential for MU-MIMO performance (some different example of this is explained above to FIG. 9).

In the last optional steps s1114 and s1116, in case the UE has a panel with multiple analog beams, it might be desirable to perform an additional UE beam training procedure. This could be done either by performing a U3 procedure per UE as described in the background, or it can be performed by a DL beam management procedure called P3, where a burst of CSI-RS resources are transmitted in one single TRP TX beam, and the UE can sweep through different UE RX beam while receiving the burst of CSI-RSs, and determine for example which UE beam that has highest RSRP or SINR.

Table 1 below illustrates the path gain values the TRP 904 may obtain as a result of performing the process described above. As illustrated in the table below, TRP 904 may obtain a path gain value for each UE panel and beam pair.

TABLE 1

| | Panel P11 | Panel P12 | Panel P21 | Panel P22 |
|---|---|---|---|---|
| b1 | pg_b1_p11 | pg_b1_p12 | pg_b1_p21 | pg_b1_p22 |
| b2 | pg_b2_p11 | pg_b2_p12 | pg_b2_p21 | pg_b2_p22 |
| b3 | pg_b3_p11 | pg_b3_p12 | pg_b3_p21 | pg_b3_p22 |
| b4 | pg_b4_p11 | pg_b4_p12 | pg_b4_p21 | pg_b4_p22 |

For example, path gain value pg_b1_p11 represents the path gain for panel p11 and beam b1. The path gain pg_b1_p11 can be obtained by TRP 904 by TRP 904 calculating Rp/Tp, where Rp is the received power of the SRS transmitted by UE 902a using panel p11 and received using beam b1, and Tp is the power at which the UE 902a transmitted the SRS. Alternatively, TRP 904 can obtain the path gain value by calculating a difference between Rp and Tp (e.g., Rp−Tp). The other path gain values are obtained using the same relevant calculations.

Once at least some of the path gain values are determined, TRP 904 can determine, for each UE, a signal to interference measure (SIM) (e.g., SIR or SINR value) for a 3-tuple consisting of: i) one beam from set 920a (the candidates for UE 902a), ii) one beam from set 920b (the candidates for UE 902b) and iii) one of the UE's panels. For instance, to calculate the SIM for the following 3-tuple {b1, b3, p12}, TRP 904 may calculate SIM_b13_p12=(P1*pg_b1_p12)/(P2*pg_b3_p12) to produce an SIR value, where P1 is the TRP Tx power to UE1, P2 is the TRP Tx power to UE2, of a hypothetical MU-MIMO transmission to UE1 and UE2. Alternatively, TRP 904 may calculate SIM_b13_p12=(P1*pg_b1_p12)/(P2*pg_b3_p12+N1) to produce an SINR value, where N1 is the receiver noise power for UE 902a. Similarly, to calculate the SIM for {b1, b3, p21}, TRP 904 may calculate SIM_b13_p21=(P2*pg_b3_p21)/(P1*pg_b1_p21) or SIM_b13_p21=(P2*pg_b3_p21)/(P1*pg_b1_p21+N2), N2 is the receiver noise power for UE 902b.

For example, in one embodiment, TRP 904 may create a data structure like the one shown in table 2 below.

TABLE 2

| Beam Pair | Panel P11 | Panel P12 | Panel P21 | Panel P22 |
| --- | --- | --- | --- | --- |
| b1, b3 | SIM_b13_p11 | SIM_b13_p12 | SIM_b13_p21 | SIM_b13_p22 |
| b1, b4 | SIM_b14_p11 | SIM_b14_p12 | SIM_b14_p21 | SIM_b14_p22 |
| b2, b3 | SIM_b23_p11 | SIM_b23_p12 | SIM_b23_p21 | SIM_b23_p22 |
| b2, b4 | SIM_b24_p11 | SIM_b24_p12 | SIM_b24_p21 | SIM_b24_p22 |

Once at least some of the SIM values are obtained, TRP 904 may be able to verify that TRP 904 can co-schedule UE 902a and UE 902b. For example, in one embodiment, TRP 904 verifies that UE 902a and UE 902b can be co-scheduled if [(SIM_b13_p12>t1) OR (SIM_b13_p11>t1)] AND [(SIM_b13_p21>t2) OR (SIM_b13_p22>t2)], wherein t1 and t2 are pre-determined thresholds (in some embodiments t1=t2).

While the invention has mainly been described in a way focusing on determine TRP beams for DL MU-MIMO, the determined TRP beams can be used for UL MU-MIMO as well as DL-MU-MIMO. For UL MU-MIMO the TRP can select which UE antenna arrangement that each respective UE should transmit on, so the TRP can in that case remove transmission on UE panels that generates strong interference. Thus, for example, TRP 904 may send to UE 902a a message indicating that, for at least one UL transmission, UE 902a should not use antenna arrangement P11 to transmit the UL data, but may use antenna arrangement P12.

Figure 12:
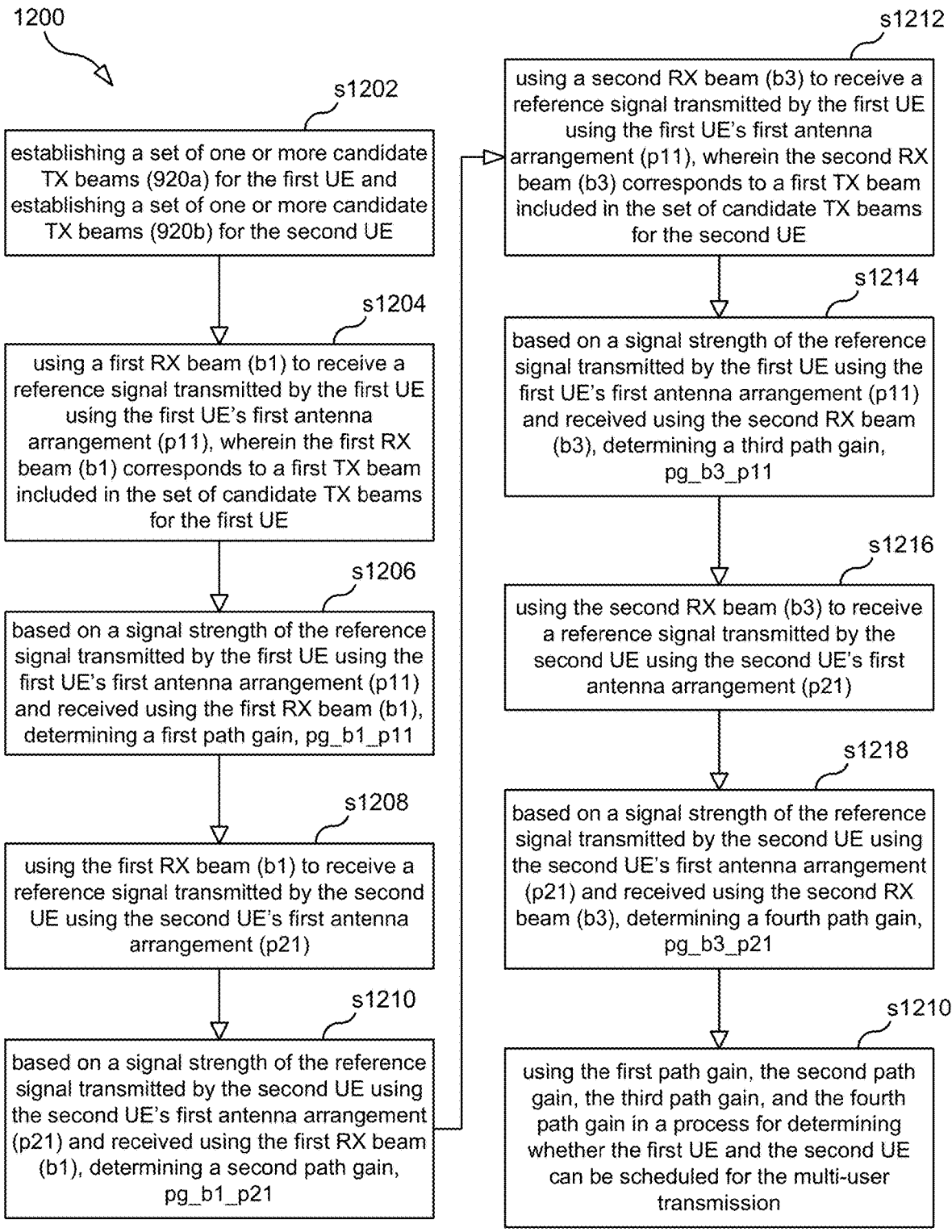
FIG. 12 is a flow chart illustrating a process according to an embodiment.

FIG. 12 is a flow chart illustrating a process 1200, according to one embodiment, for scheduling at least a first UE (UE 902a), and a second UE (UE 902b) for an MU transmission, wherein the first UE comprises a first antenna arrangement and a second antenna arrangement and the second UE comprises a first antenna arrangement and a second antenna arrangement. Process 1200 may begin with step s1202. As used herein, an antenna arrangement is an antenna (e.g., a directional antenna) or an antenna panel. For this example, the first UE's first antenna arrangement is panel p11, the first UE's second antenna arrangement is panel p12, the second UE's first antenna arrangement is panel p21, and the second UE's second antenna arrangement is panel p22.

Step s1202 comprises establishing the set of one or more candidate TX beams 920a for the first UE and establishing the set of one or more candidate TX beams 920b for the second UE.

Step s1204 comprises using first RX beam b1 to receive a reference signal transmitted by the first UE using the first UE's first antenna arrangement p11, wherein the first RX beam b1 corresponds to a first TX beam included in the set of candidate TX beams for the first UE.

Step s1206 comprises, based on a signal strength of the reference signal transmitted by the first UE using the first UE's first antenna arrangement p11 and received using the first RX beam b1, determining a first path gain, pg_b1_p11.

Step s1208 comprises using the first RX beam b1 to receive a reference signal transmitted by the second UE using the second UE's first antenna arrangement p21.

Step s1210 comprises, based on a signal strength of the reference signal transmitted by the second UE using the second UE's first antenna arrangement p21 and received using the first RX beam b1, determining a second path gain, pg_b1_p21.

Step s1212 comprises using the second RX beam b3 to receive a reference signal transmitted by the first UE using the first UE's first antenna arrangement p11, wherein the second RX beam b3 corresponds to a first TX beam included in the set of candidate TX beams for the second UE.

Step s1214 comprises, based on a signal strength of the reference signal transmitted by the first UE using the first UE's first antenna arrangement p11 and received using the second RX beam b3, determining a third path gain, pg_b3_p11.

Step s1216 comprises using the second RX beam b3 to receive a reference signal transmitted by the second UE using the second UE's first antenna arrangement p21.

Step s1218 comprises, based on a signal strength of the reference signal transmitted by the second UE using the second UE's first antenna arrangement p21 and received using the second RX beam b3, determining a fourth path gain, pg_b3_p21.

Step s1220 comprises using the first path gain, the second path gain, the third path gain, and the fourth path gain in a process for determining whether the first UE and the second UE can be scheduled for the multi-user transmission.

In some embodiments, the process for determining whether the first UE and the second UE can be scheduled for the MU transmission comprises: 1) calculating a first SIM using the first path gain, pg_b1_p11, and the third path gain, pg_b3_p11, thereby producing a first SIM that is associated with the 3-tuple consisting of the first RX beam b1, the second RX beam b3, and the first UE's first antenna arrangement p11; 2) calculating a second SIM using the second path gain, pg_b1_p21, and the fourth path gain, pg_b3_p21, thereby producing a second SIM that is associated with the 3-tuple consisting of the first RX beam b1, the second RX beam b3, and the second UE's first antenna arrangement p21; and using the first SIM and the second SIM in the process for determining whether the first UE and the second UE can be scheduled for the multi-user transmission.

In some embodiments, using the first SIM and the second SIM in the process for determining whether the first UE and the second UE can be scheduled for the multi-user transmission comprises: 1) determining whether the first SIM satisfies a first condition e.g., first SIM is greater than a threshold; 2) determining whether the second SIM satisfies a second condition e.g., second SIM is greater than the threshold; and determining that the first UE and the second UE can be scheduled for the multi-user transmission as a result of determining that first SIM satisfies the first condition and the second SIM satisfies the second condition. In other words, the network may, in certain scenarios (e.g., scenarios in which the first and second SIM satisfy the conditions), determine that two UEs can be scheduled for the multi-user transmission based solely on the first SIM (the SIM for the first UE's first panel) and the second SIM (the SIM for the second UE's first panel)—i.e., regardless of all other SIMs. Hence, in such scenarios the other SIMs are ignored, including the SIM for the first UE's second panel.

In some embodiments, the process also includes calculating an average SIM using the first SIM and the second SIM; determining whether the calculated average SIM is a maximum average SIM; and as a result of determining that the calculated average SIM is the maximum average SIM, using for the multi-user transmission a TX beam combination that comprises the TX beam to which the first RX beam corresponds and the TX beam to which the second RX beam corresponds.

In some embodiments, calculating the first SIM comprises calculating a first signal-to-interference ratio, SIR, or a first signal-to-interference-plus-noise ratio SINR, and calculating the second SIM comprises calculating a second SIR or a second SINR.

In some embodiments, the process further includes: using the first RX beam b1 to receive a reference signal transmitted by the first UE using the first UE's second antenna arrangement p12; using the first RX beam b1 to receive a reference signal transmitted by the second UE using the second UE's second antenna arrangement p22; based on a signal strength of the reference signal transmitted by the first UE using the first UE's second antenna arrangement p12 and received using the first RX beam b1, determining a fifth path gain, pg_b1_p12; based on a signal strength of the reference signal transmitted by the second UE using the second UE's second antenna arrangement p22 and received using the first RX beam b1, determining a sixth path gain, pg_b1_p22; using the second RX beam b3 to receive a reference signal transmitted by the first UE using the first UE's second antenna arrangement p12; using the second RX beam b3 to receive a reference signal transmitted by the second UE using the second UE's second antenna arrangement p22; based on a signal strength of the reference signal transmitted by the first UE using the first UE's second antenna arrangement p12 and received using the second RX beam b3, determining a seventh path gain, pg_b3_p12; based on a signal strength of the reference signal transmitted by the second UE using the second UE's second antenna arrangement p22 and received using the second RX beam b3, determining an eighth path gain, pg_b3_p22; and using the first path gain, the second path gain, the third path gain, the fourth path gain, the fifth path gain, the sixth path gain, the seventh path gain, and the eighth path gain in the process for determining whether the first UE and the second UE can be scheduled for the multi-user transmission.

In some embodiments, the process also includes: using a third RX beam b2 to receive a reference signal transmitted by the first UE using the first UE's first antenna arrangement p11, wherein the third RX beam b2 corresponds to a second TX beam included in the set of candidate TX beams for the first UE; based on a signal strength of the reference signal transmitted by the first UE using the first UE's first antenna arrangement p11 and received using the third RX beam b2, determining a ninth path gain, pg_b2_p11; using the third RX beam b2 to receive a reference signal transmitted by the second UE using the second UE's first antenna arrangement p21; based on a signal strength of the reference signal transmitted by the second UE using the second UE's first antenna arrangement p21 and received using the third RX beam b2, determining a tenth path gain, pg_b2_p21; using a fourth RX beam b4 to receive a reference signal transmitted by the first UE using the first UE's first antenna arrangement p11, wherein the fourth RX beam b4 corresponds to a second TX beam included in the set of candidate TX beams for the second UE; based on a signal strength of the reference signal transmitted by the first UE using the first UE's first antenna arrangement p11 and received using the fourth RX beam b4, determining an eleventh path gain, pg_b4_p11; using the fourth RX beam b4 to receive a reference signal transmitted by the second UE using the second UE's first antenna arrangement p21; based on a signal strength of the reference signal transmitted by the second UE using the second UE's first antenna arrangement p21 and received using the fourth RX beam b4, determining a twelfth path gain, pg_b4_p21; and using all of said path gains in the process for determining whether the first UE and the second UE can be scheduled for the multi-user transmission.

In some embodiments, the process also includes using the first path gain, the second path gain, the third path gain, and the fourth path gain in a process for determining a best pair of beams, wherein the best pair of beams comprises a beam from the set of candidate TX beams 920a for the first UE and a beam from the set of candidate TX beams 920b for the second UE.

In some embodiments, the process also includes determining that the first UE and the second UE are candidates for co-scheduling, wherein the determining comprises determining that an estimated angular separation between the first UE and the second UE is larger than a certain threshold.

In some embodiments, the process also includes, after determining that the first UE and the second UE are candidates for co-scheduling, performing the steps of: triggering the first UE to transmit a reference signal using the first UE's first antenna arrangement p11 and using the first UE's second antenna arrangement p12; and triggering the second UE to transmit a reference signal using the second UE's first antenna arrangement p21 and using the second UE's second antenna arrangement p22. In some embodiments, the process also includes, prior to triggering the first UE: configuring the first UE with a SRS first resource set for the first UE's first antenna arrangement; and configuring the first UE with a second SRS resource set for the first UE's second antenna arrangement. In some embodiments, the process also includes determining the estimated angular separation based on Synchronization Signal Block, SSB, beam information obtained from the first UE and SSB beam information obtained from the second UE.

In some embodiments, the process also includes performing a U3 or a P3 procedure. In some embodiments, the process also includes transmitting to the first UE a message indicating that, for at least one UL transmission, the first UE should not use the first antenna arrangement P11 to transmit the UL transmission, but may use the second antenna arrangement P12.

Figure 13:
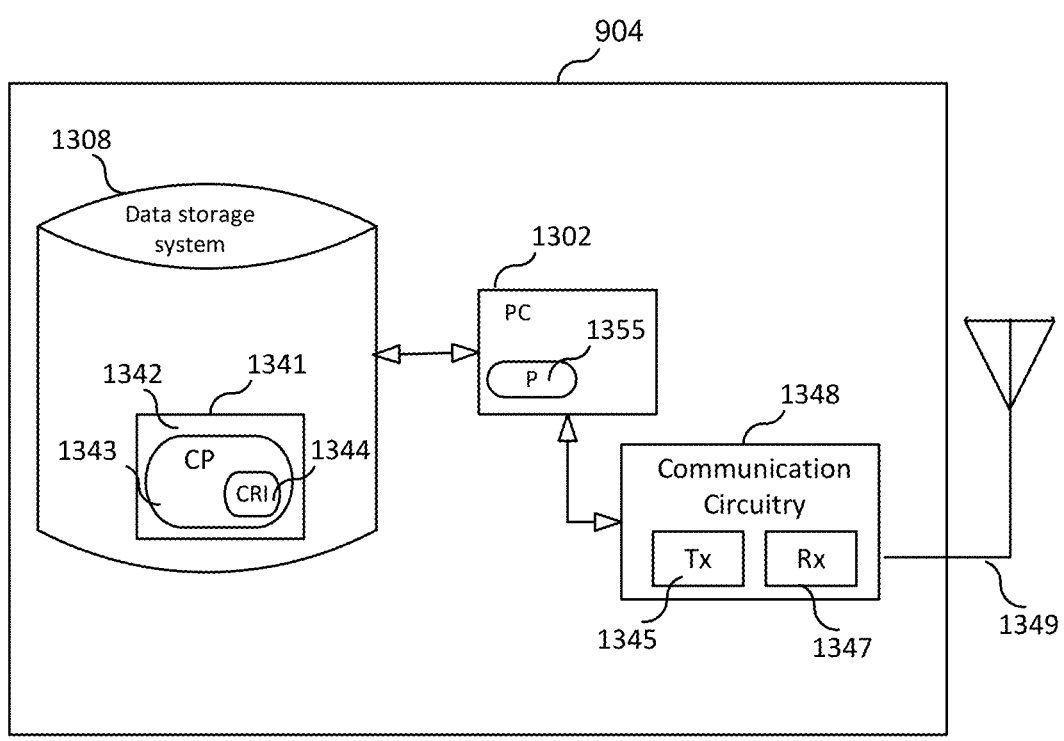
FIG. 13 is a block diagram of an apparatus according to one embodiment.

FIG. 13 is a block diagram of TRP 904, according to some embodiments. As shown in FIG. 13, TRP 904 may comprise: processing circuitry (PC) 1302, which may include one or more processors (P) 1355 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; communication circuitry 1348 coupled to an antenna arrangement 1349 and comprising a transmitter (Tx) 1345 and a receiver (Rx) 1347 for enabling TRP 904 to transmit data and receive data (e.g., wirelessly transmit/receive data); and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes TRP 904 to perform steps described herein (e.g., steps described herein with reference to the flow charts). In other embodiments, TRP 904 may be configured to perform steps described herein without the need for code. That is, for example, PC 1302 may consist merely of one or more ASICs. Hence, the features of the embodiments described herein may be implemented in hardware and/or software.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for scheduling at least a first user equipment (UE) and a second UE for a multi-user multiple-input-multiple-output (MU-MIMO) transmission, wherein the first UE comprises a first antenna arrangement and a second antenna arrangement and the second UE comprises a first antenna arrangement and a second antenna arrangement, the method comprising:
   establishing a set of one or more candidate transmit (TX) beams for the first UE;
   establishing a set of one or more candidate TX beams for the second UE;
   using a first receive (RX) beam to receive a reference signal transmitted by the first UE using the first UE's first antenna arrangement, wherein the first RX beam corresponds to a first TX beam included in the set of candidate TX beams for the first UE;
   based on a signal strength of the reference signal transmitted by the first UE using the first UE's first antenna arrangement and received using the first RX beam, determining a first path gain;
   using the first RX beam to receive a reference signal transmitted by the second UE using the second UE's first antenna arrangement;
   based on a signal strength of the reference signal transmitted by the second UE using the second UE's first antenna arrangement and received using the first RX beam, determining a second path gain;
   using a second RX beam to receive a reference signal transmitted by the first UE using the first UE's first antenna arrangement, wherein the second RX beam corresponds to a first TX beam included in the set of candidate TX beams for the second UE;
   based on a signal strength of the reference signal transmitted by the first UE using the first UE's first antenna arrangement and received using the second RX beam, determining a third path gain;
   using the second RX beam to receive a reference signal transmitted by the second UE using the second UE's first antenna arrangement;
   based on a signal strength of the reference signal transmitted by the second UE using the second UE's first antenna arrangement and received using the second RX beam, determining a fourth path gain;
   using the first path gain, the second path gain, the third path gain, and the fourth path gain in a process for determining whether the first UE and the second UE can be co-scheduled for the MU-MIMO transmission.

2. The method of claim 1, wherein the process for determining whether the first UE and the second UE can be scheduled for the MU-MIMO transmission comprises:
   calculating a first signal to interference measure (SIM) using the first path gain, and the third path gain, thereby producing a first SIM that is associated with the first RX beam, the second RX beam, and the first UE's first antenna arrangement;
   calculating a second SIM using the second path gain and the fourth path gain, thereby producing a second SIM that is associated with the first RX beam, the second RX beam, and the second UE's first antenna arrangement; and
   using the first SIM and the second SIM in the process for determining whether the first UE and the second UE can be scheduled for the MU-MIMO transmission.

3. The method of claim 2, wherein using the first SIM and the second SIM in the process for determining whether the first UE and the second UE can be scheduled for the MU-MIMO transmission comprises:
   determining whether the first SIM satisfies a first condition;
   determining whether the second SIM satisfies a second condition; and
   determining that the first UE and the second UE can be scheduled for the MU-MIMO transmission as a result of determining that first SIM satisfies the first condition and the second SIM satisfies the second condition.

4. The method of claim 3, wherein
   calculating the first SIM comprises calculating a first signal-to-interference ratio (SIR) or a first signal-to-interference-plus-noise ratio (SINR), and
   calculating the second SIM comprises calculating a second SIR or a second SINR.

5. The method of claim 1, further comprising:
   using the first RX beam to receive a reference signal transmitted by the first UE using the first UE's second antenna arrangement;
   using the first RX beam to receive a reference signal transmitted by the second UE using the second UE's second antenna arrangement;
   based on a signal strength of the reference signal transmitted by the first UE using the first UE's second antenna arrangement and received using the first RX beam, determining a fifth path gain;
   based on a signal strength of the reference signal transmitted by the second UE using the second UE's second antenna arrangement and received using the first RX beam, determining a sixth path gain;
   using the second RX beam to receive a reference signal transmitted by the first UE using the first UE's second antenna arrangement;
   using the second RX beam to receive a reference signal transmitted by the second UE using the second UE's second antenna arrangement;
   based on a signal strength of the reference signal transmitted by the first UE using the first UE's second antenna arrangement and received using the second RX beam, determining a seventh path gain;
   based on a signal strength of the reference signal transmitted by the second UE using the second UE's second antenna arrangement and received using the second RX beam, determining an eighth path gain; and using the first path gain, the second path gain, the third path gain, the fourth path gain, the fifth path gain, the sixth path gain, the seventh path gain, and the eighth path gain in the process for determining whether the first UE and the second UE can be scheduled for the MU-MIMO transmission.

6. The method of claim 5, further comprising:

using a third RX beam to receive a reference signal transmitted by the first UE using the first UE's first antenna arrangement, wherein the third RX beam corresponds to a second TX beam included in the set of candidate TX beams for the first UE;

based on a signal strength of the reference signal transmitted by the first UE using the first UE's first antenna arrangement and received using the third RX beam, determining a ninth path gain;

using the third RX beam to receive a reference signal transmitted by the second UE using the second UE's first antenna arrangement;

based on a signal strength of the reference signal transmitted by the second UE using the second UE's first antenna arrangement and received using the third RX beam, determining a tenth path gain;

using a fourth RX beam to receive a reference signal transmitted by the first UE using the first UE's first antenna arrangement, wherein the fourth RX beam corresponds to a second TX beam included in the set of candidate TX beams for the second UE;

based on a signal strength of the reference signal transmitted by the first UE using the first UE's first antenna arrangement and received using the fourth RX beam, determining an eleventh path gain;

using the fourth RX beam to receive a reference signal transmitted by the second UE using the second UE's first antenna arrangement;

based on a signal strength of the reference signal transmitted by the second UE using the second UE's first antenna arrangement and received using the fourth RX beam, determining a twelfth path gain; and using all of said path gains in the process for determining whether the first UE and the second UE can be scheduled for the MU-MIMO transmission.

7. The method of claim 1, further comprising using the first path gain, the second path gain, the third path gain, and the fourth path gain in a process for determining a best pair of beams, wherein the best pair of beams comprises a beam from the set of candidate TX beams for the first UE and a beam from the set of candidate TX beams for the second UE.

8. The method of claim 1, further comprising determining that the first UE and the second UE are candidates for co-scheduling, wherein the determining that the first UE and the second UE are candidates for co-scheduling comprises determining that an estimated angular separation between the first UE and the second UE is larger than a certain threshold.

9. The method of claim 8, further comprising, after determining that the first UE and the second UE are candidates for co-scheduling, performing the steps of:

triggering the first UE to transmit a reference signal using the first UE's first antenna arrangement and using the first UE's second antenna arrangement; and triggering the second UE to transmit a reference signal using the second UE's first antenna arrangement and using the second UE's second antenna arrangement.

10. The method of claim 9, further comprising, prior to triggering the first UE:

configuring the first UE with a sounding reference signal (SRS) first resource set for the first UE's first antenna arrangement; and configuring the first UE with a second SRS resource set for the first UE's second antenna arrangement.

11. The method of claim 8, further comprising determining the estimated angular separation based on Synchronization Signal Block (SSB) beam information obtained from the first UE and SSB beam information obtained from the second UE.

12. The method of claim 1, further comprising performing a U3 or a P3 procedure.

13. The method of claim 1, further comprising transmitting to the first UE a message indicating that, for at least one UL transmission, the fist UE should not use the first antenna arrangement to transmit the UL transmission.

14. The method of claim 3, further comprising:

calculating an average SIM using the first SIM and the second SIM;

determining whether the calculated average SIM is a maximum average SIM; and as a result of determining that the calculated average SIM is the maximum average SIM, using for the MU-MIMO transmission a TX beam combination that comprises the TX beam to which the first RX beam corresponds and the TX beam to which the second RX beam corresponds.

15. A transmission and reception point (TRP) apparatus, the TRP apparatus comprising:

memory; and processing circuitry coupled to the memory, wherein the TRP is configured to:

establish a set of one or more candidate transmit (TX) beams for a first user equipment, UE, the first UE having a first antenna arrangement and a second antenna arrangement;

establish a set of one or more candidate TX beams for a second UE, the second UE having a first antenna arrangement and a second antenna arrangement;

use a first receive (RX) beam to receive a reference signal transmitted by the first UE using the first UE's first antenna arrangement, wherein the first RX beam corresponds to a first TX beam included in the set of candidate TX beams for the first UE;

based on a signal strength of the reference signal transmitted by the first UE using the first UE's first antenna arrangement and received using the first RX beam, determine a first path gain;

use the first RX beam to receive a reference signal transmitted by the second UE using the second UE's first antenna arrangement;

based on a signal strength of the reference signal transmitted by the second UE using the second UE's first antenna arrangement and received using the first RX beam, determine a second path gain;

use a second RX beam to receive a reference signal transmitted by the first UE using the first UE's first antenna arrangement, wherein the second RX beam corresponds to a first TX beam included in the set of candidate TX beams for the second UE;

based on a signal strength of the reference signal transmitted by the first UE using the first UE's first antenna arrangement and received using the second RX beam, determine a third path gain;

use the second RX beam to receive a reference signal transmitted by the second UE using the second UE's first antenna arrangement;

based on a signal strength of the reference signal transmitted by the second UE using the second UE's first antenna arrangement and received using the second RX beam, determine a fourth path gain;

use the first path gain, the second path gain, the third path gain, and the fourth path gain in a process for determining whether the first UE and the second UE can be co-scheduled for a multi-user multiple-input-multiple-output (MU-MIMO) transmission.

16. The TRP apparatus of claim 15, wherein the process for determining whether the first UE and the second UE can be scheduled for the MU-MIMO transmission comprises:

calculating a first signal to interference measure (SIM) using the first path gain, and the third path gain, thereby producing a first SIM that is associated with the first RX beam, the second RX beam, and the first UE's first antenna arrangement;

calculating a second SIM using the second path gain and the fourth path gain, thereby producing a second SIM that is associated with the first RX beam, the second RX beam, and the second UE's first antenna arrangement; and using the first SIM and the second SIM in the process for determining whether the first UE and the second UE can be scheduled for the MU-MIMO transmission.

17. A computer program product comprising a non-transitory computer readable medium storing a computer program comprising instructions for adapting an apparatus to perform a method for scheduling at least a first user equipment (UE) and a second UE for a multi-user multiple-input-multiple-output (MU-MIMO) transmission, wherein the first UE comprises a first antenna arrangement and a second antenna arrangement and the second UE comprises a first antenna arrangement and a second antenna arrangement, the method comprising:

establishing a set of one or more candidate transmit (TX) beams for the first UE;

establishing a set of one or more candidate TX beams for the second UE;

using a first receive (RX) beam to receive a reference signal transmitted by the first UE using the first UE's first antenna arrangement, wherein the first RX beam corresponds to a first TX beam included in the set of candidate TX beams for the first UE;

based on a signal strength of the reference signal transmitted by the first UE using the first UE's first antenna arrangement and received using the first RX beam, determining a first path gain;

using the first RX beam to receive a reference signal transmitted by the second UE using the second UE's first antenna arrangement;

based on a signal strength of the reference signal transmitted by the second UE using the second UE's first antenna arrangement and received using the first RX beam, determining a second path gain;

using a second RX beam to receive a reference signal transmitted by the first UE using the first UE's first antenna arrangement, wherein the second RX beam corresponds to a first TX beam included in the set of candidate TX beams for the second UE;

based on a signal strength of the reference signal transmitted by the first UE using the first UE's first antenna arrangement and received using the second RX beam, determining a third path gain;

using the second RX beam to receive a reference signal transmitted by the second UE using the second UE's first antenna arrangement;

based on a signal strength of the reference signal transmitted by the second UE using the second UE's first antenna arrangement and received using the second RX beam, determining a fourth path gain;

using the first path gain, the second path gain, the third path gain, and the fourth path gain in a process for determining whether the first UE and the second UE can be co-scheduled for the MU-MIMO transmission.

18. The TRP apparatus of claim 16, wherein using the first SIM and the second SIM in the process for determining whether the first UE and the second UE can be scheduled for the MU-MIMO transmission comprises:

determining whether the first SIM satisfies a first condition;

determining whether the second SIM satisfies a second condition; and determining that the first UE and the second UE can be scheduled for the MU-MIMO transmission as a result of determining that first SIM satisfies the first condition and the second SIM satisfies the second condition.

19. The TRP apparatus of claim 15, wherein the TRP apparatus is further configured to:

use the first RX beam to receive a reference signal transmitted by the first UE using the first UE's second antenna arrangement;

use the first RX beam to receive a reference signal transmitted by the second UE using the second UE's second antenna arrangement;

based on a signal strength of the reference signal transmitted by the first UE using the first UE's second antenna arrangement and received using the first RX beam, determine a fifth path gain;

based on a signal strength of the reference signal transmitted by the second UE using the second UE's second antenna arrangement and received using the first RX beam, determine a sixth path gain;

use the second RX beam to receive a reference signal transmitted by the first UE using the first UE's second antenna arrangement;

use the second RX beam to receive a reference signal transmitted by the second UE using the second UE's second antenna arrangement;

based on a signal strength of the reference signal transmitted by the first UE using the first UE's second antenna arrangement and received using the second RX beam, determine a seventh path gain;

based on a signal strength of the reference signal transmitted by the second UE using the second UE's second antenna arrangement and received using the second RX beam, determine an eighth path gain; and use the first path gain, the second path gain, the third path gain, the fourth path gain, the fifth path gain, the sixth path gain, the seventh path gain, and the eighth path gain in the process for determining whether the first UE and the second UE can be scheduled for the MU-MIMO transmission.

20. The TRP apparatus of claim 19, wherein the TRP apparatus is further configured to:

use a third RX beam to receive a reference signal transmitted by the first UE using the first UE's first antenna arrangement, wherein the third RX beam corresponds to a second TX beam included in the set of candidate TX beams for the first UE;

based on a signal strength of the reference signal transmitted by the first UE using the first UE's first antenna arrangement and received using the third RX beam, determine a ninth path gain;

use the third RX beam to receive a reference signal transmitted by the second UE using the second UE's first antenna arrangement;

based on a signal strength of the reference signal transmitted by the second UE using the second UE's first antenna arrangement and received using the third RX beam, determine a tenth path gain;

use a fourth RX beam to receive a reference signal transmitted by the first UE using the first UE's first antenna arrangement, wherein the fourth RX beam corresponds to a second TX beam included in the set of candidate TX beams for the second UE;

based on a signal strength of the reference signal transmitted by the first UE using the first UE's first antenna arrangement and received using the fourth RX beam, determine an eleventh path gain;

use the fourth RX beam to receive a reference signal transmitted by the second UE using the second UE's first antenna arrangement;

based on a signal strength of the reference signal transmitted by the second UE using the second UE's first antenna arrangement and received using the fourth RX beam, determine a twelfth path gain; and use all of said path gains in the process for determining whether the first UE and the second UE can be scheduled for the MU-MIMO transmission.

* * * * *